United States Patent

Steinbeck

[11] Patent Number: 5,359,944
[45] Date of Patent: Nov. 1, 1994

[54] FURNITURE CONSTRUCTION AND METHOD OF MANUFACTURING

[75] Inventor: Linn A. Steinbeck, Auburn, Wash.

[73] Assignee: Hon Industries Inc., Muscatine, Iowa

[21] Appl. No.: 891,272

[22] Filed: May 29, 1992

[51] Int. Cl.$^5$ .......................... A47B 3/00; A47B 13/08
[52] U.S. Cl. ....................................... 403/294; 52/783
[58] Field of Search ............... 108/111, 161, 154, 159, 108/158; 312/195, 193, 263; 52/783, 813, 821, 827, 828, 811

[56] References Cited

U.S. PATENT DOCUMENTS

| | | | |
|---|---|---|---|
| 909,787 | 1/1909 | Hanley | 52/813 X |
| 1,607,783 | 11/1926 | Landaw | 52/783 X |
| 1,684,966 | 9/1928 | O'Conor | 52/828 X |
| 1,777,317 | 10/1930 | Land | 52/827 |
| 1,852,342 | 4/1932 | Ash | 52/827 X |
| 1,926,817 | 9/1933 | Rastetter | 52/783 |
| 2,279,864 | 4/1942 | Eide | |
| 2,732,598 | 1/1956 | Crawford | 52/827 |
| 3,000,680 | 9/1961 | Zelenko | |
| 3,389,666 | 6/1968 | Schultze-Bonatz | |
| 3,527,486 | 9/1970 | Gamp | |
| 3,838,902 | 10/1974 | Tenani | |
| 3,870,390 | 3/1975 | Hermann | |
| 3,966,339 | 6/1976 | Nemecek | |
| 4,326,760 | 4/1982 | Ziegelheim et al. | |
| 4,536,044 | 4/1985 | Ziegelheim et al. | |
| 4,595,105 | 1/1986 | Gold | |
| 4,869,564 | 9/1989 | Lechman | |
| 4,886,326 | 12/1989 | Kuzyk | |

Primary Examiner—Clifford D. Crowder
Assistant Examiner—Paul C. Lewis
Attorney, Agent, or Firm—Jones, Day, Reavis & Pogue

[57] ABSTRACT

Office furniture units, particularly desks, are fabricated panel members cut from standard pre-finished flat wood panels, their precise final configuration, by an NC controlled automatic router, including all holes, recesses and the like required in each panel member. The panel members have configurations which constitute the intelligence to assure their precise alignment as they are subassembled into furniture panel components by securing the appropriate panel members together in multiple layers, and for reception of two-part mechanical fasteners in appropriate positions to insure proper positioning of the panel components with respect to one another in the final assembly of the panel components into a functional office furniture unit. The panel components are assembled with one another in T-joint fashion, with the edge surface of one panel abutting a major side surface of the respective transverse panel to which being joined, using cam-type fastener components which secure the panel components together in firm edge-abutment relationships. The multiple layers of panel members provide reinforcement and rigidity of the panel components where necessary, as well as visual thickness effect. In each instance, one of the panel members is of the configuration of the final panel component. Several of the panel members include edge tabs which protrude laterally of the respective subassembled components for interfitting in recesses provided in mating panels to provide enhanced shear strength across the T-joint interpanel connections in the final assembly of the furniture unit. The structure and method also provide flexibility to produce differing furniture items in successive machining and assembly operations, for rapid production of a variety of different products "to order" from a single machine production line.

19 Claims, 7 Drawing Sheets

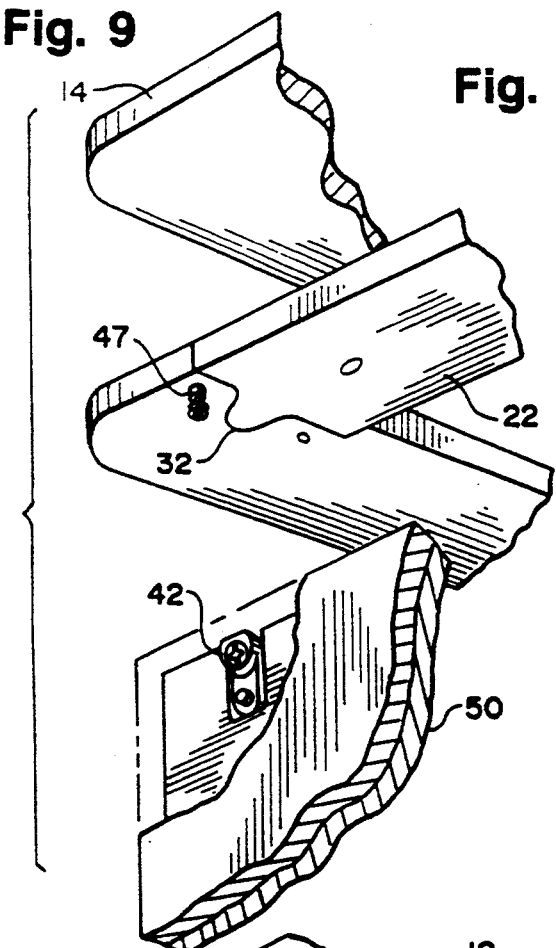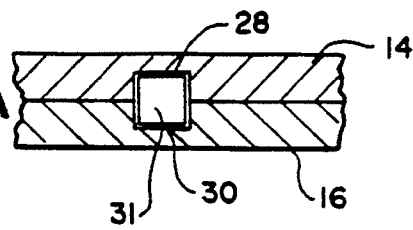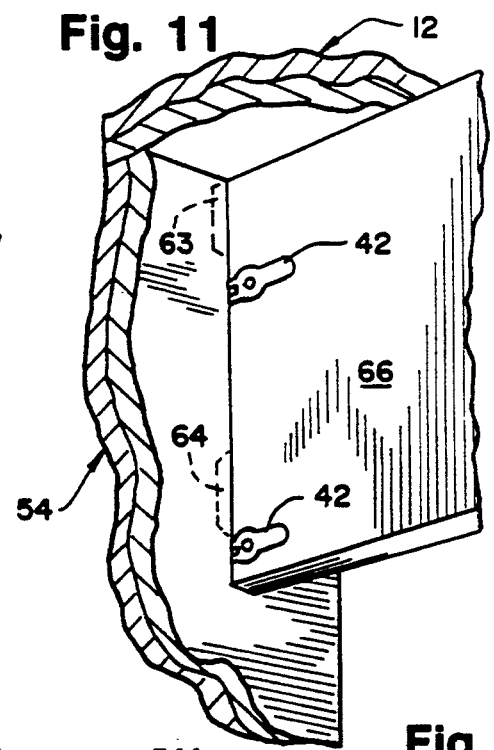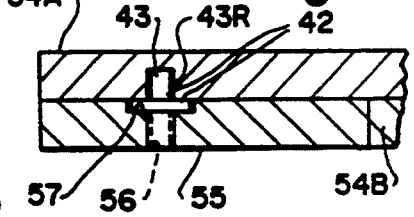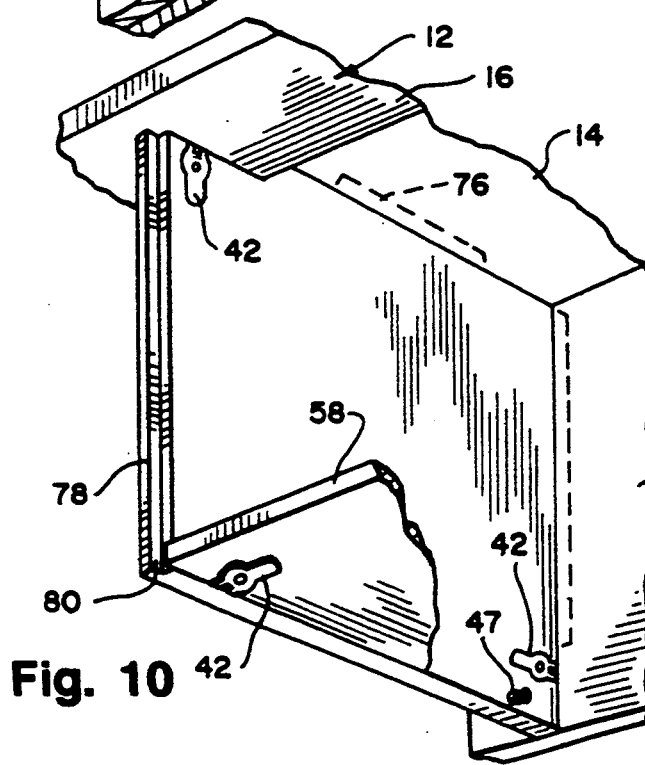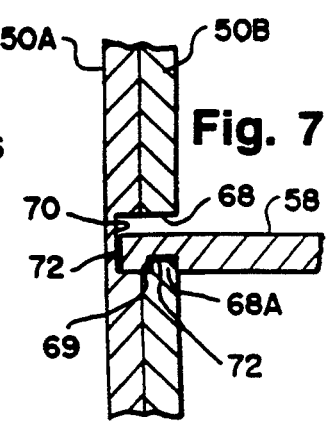

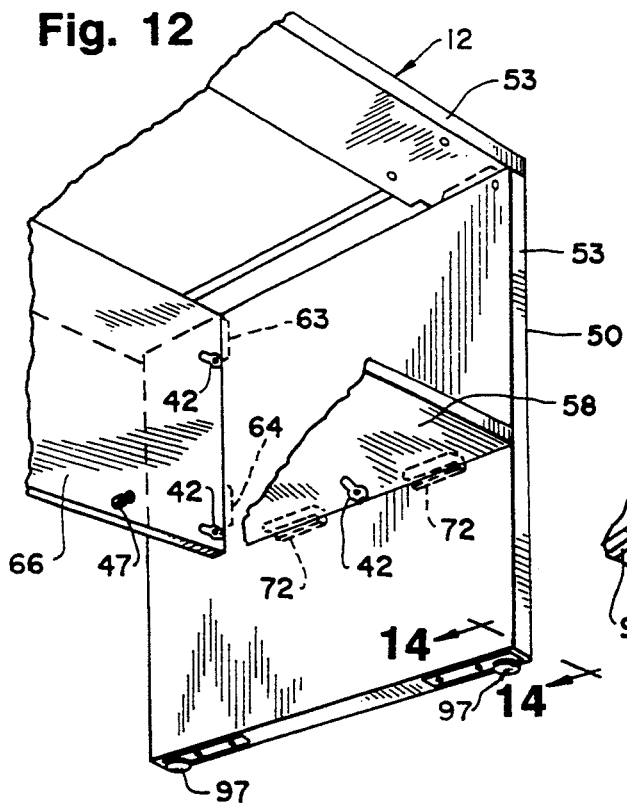
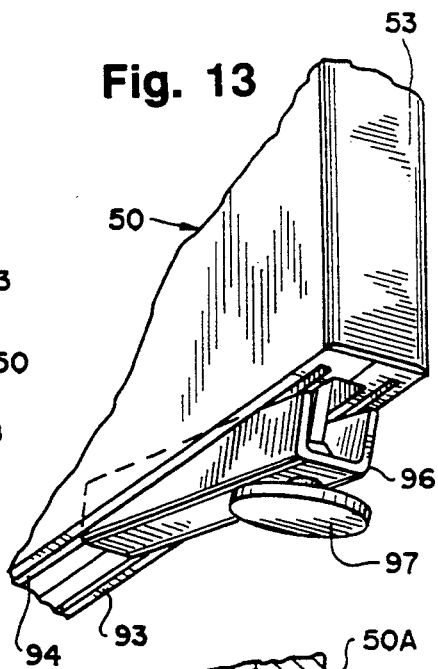
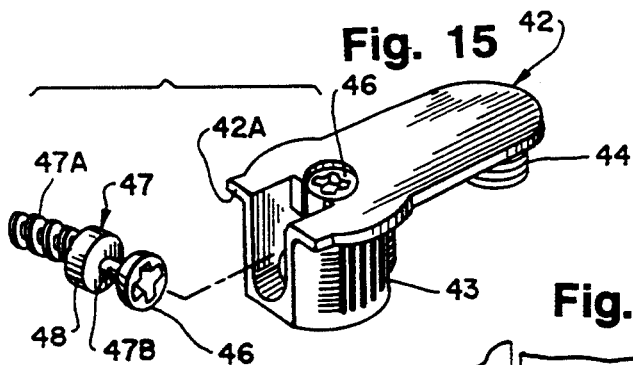
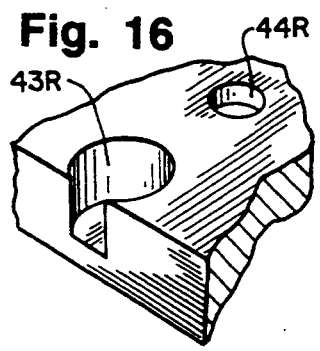
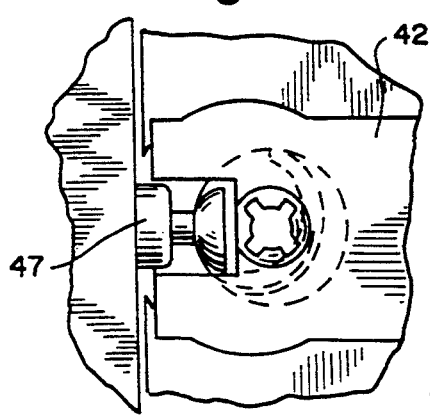
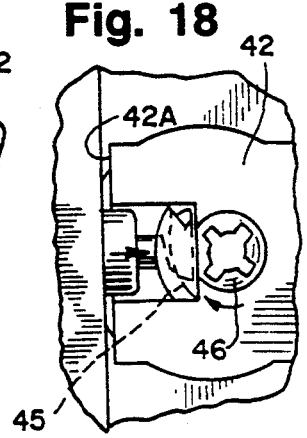

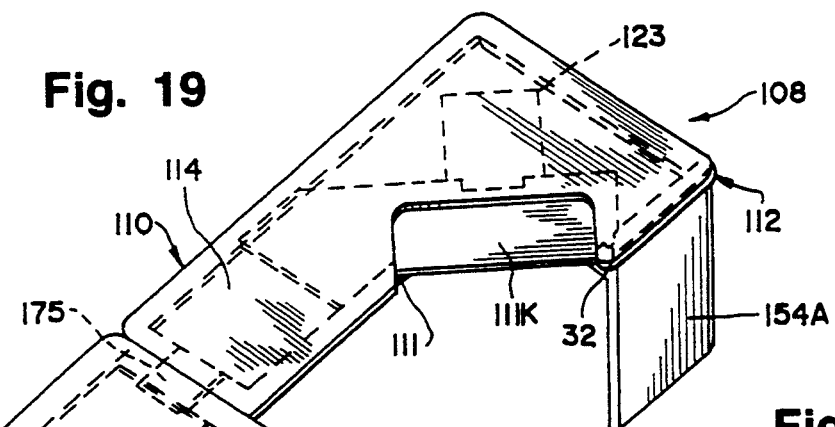
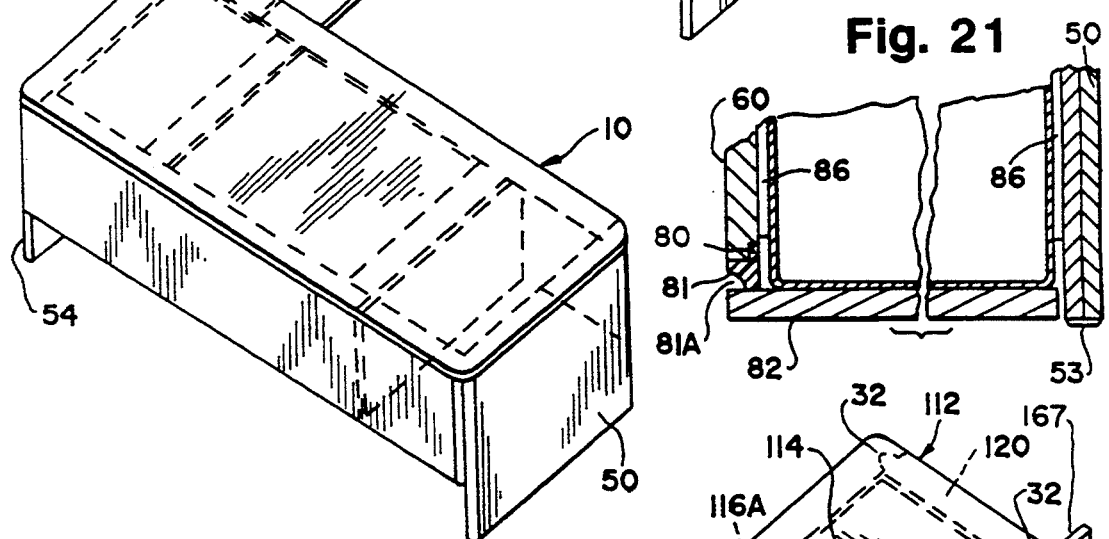
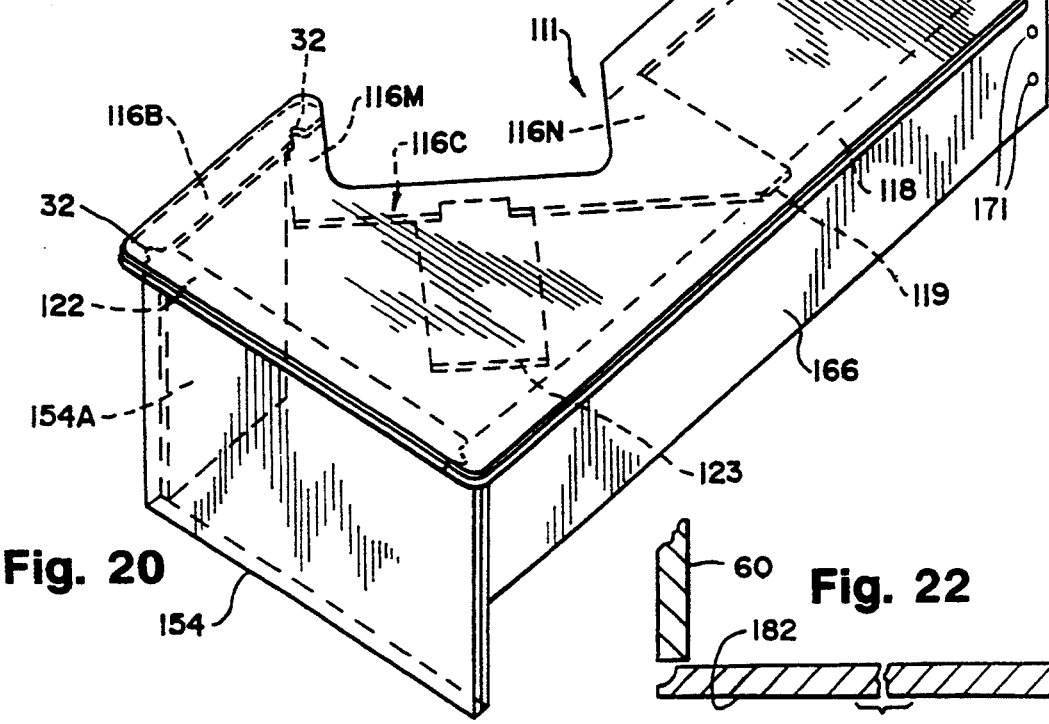
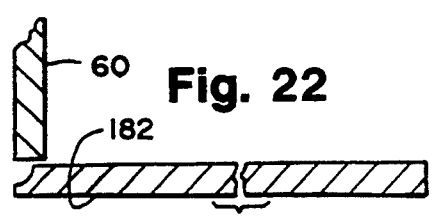

FURNITURE CONSTRUCTION AND METHOD OF MANUFACTURING

BACKGROUND OF THE INVENTION

This invention relates to office furniture and more particularly to designs for office furniture which facilitate automated on-demand job production of wood office furniture from a stock of conventional flat wood panels, and to related production methods.

Various proposals have been made for designs and manners of assembly of office furniture which facilitate ease of assembly. This invention relates to improved designs of such furniture and methods of manufacture whereby a wide variety of furniture designs and configurations may be produced from standard prefinished flat wood panels of substantial thickness, with a high degree of automation and ease of assembly into specific furniture units which may vary one after another in a single-line production process. As used herein, the terms "flat wood panel" or "flat wood panel member" mean a panel or panel member at least $\frac{1}{2}$ inch thick and formed of solid wood or of wood particles or wood laminates and which is of uniform thickness throughout its length and width particle board is a preferred example. Other examples include solid wood panels and plywood panels.

OBJECTS OF THE INVENTION

The general object of this invention is to provide improved furniture designs which facilitate automated production of office furniture from flat wood panels.

It is a more specific object to provide such designs which will provide good structural integrity and strength, pleasing aesthetic appearance and economy of production.

Another object of this invention is to provide a workstation top panel structure which is formed of relatively thin flat wood panel components and which forms a rigid worksurface member.

It is a further object of this invention to provide improved designs of office furniture wherein multiple components are self-aligning and interlocking, thereby avoiding the need for external jigging fixtures during assembly.

A further object of this invention is to provide office furniture constructions whereby desired appearances of various thicknesses of different components can be obtained readily from flat wood panels of standard thickness.

It is a further object of this invention to provide improved methods of manufacture of office furniture, including desks.

It is a more particular object of this invention to provide improved methods of manufacture which readily permit economical production of a wide variety of completed office furniture, on demand, in a single continuous production operation from a stock of flat wood panels.

SUMMARY OF THE INVENTION

The furniture is of a design that is adapted for cutting the parts from standard prefinished flat wood panels and subassembly of those panel parts into appropriate furniture components, with subsequent assembly of those components into the furniture unit, all with internal self-jigging (self-aligning) and interlocking of the parts, thus avoiding the need for any external jigging fixtures.

The panels may be conventional wood particle board panels, e.g., high density particle boards, such as 45 lbs or greater, $\frac{5}{8}$" or $\frac{3}{4}$" thick, which have a thin finish laminate bonded on one side and a balancing laminate bonded on the opposite side to seal the opposite side and to prevent warping. Examples of such finish laminates include paper foils of about 0.007" thickness and high pressure laminates of about 0.031" thickness. Such particle board typically is of varying density through its thickness, being of relatively high density near each side surface and low density in the center core zone. For example, this means that fasteners penetrating through a side surface will be retained much more firmly than fasteners penetrating through an edge surface.

All of the furniture parts are cut and formed from such wood panels, preferably by use of automatic tooling such as multi-tool routers with numerical computer controls (NC). Where the desired thickness of a component exceeds the thickness of the stock panels being used, multiple parts are cut and superimposed with one another to obtain the desired thickness in the necessary areas, whether it be only in an edge portion or throughout the area of the part. Fastener components may be encased at the interface between such parts. Strength and rigidity of the top structure also is obtained by the manner of joining such superimposed panel components, preferably using relatively narrow reinforcement components on the underside of a single unitary top panel that provides a finished top worksurface such as for a desk top. Thus desired strength requirements and good aesthetic appearance are attained.

The subject designs permit the several necessary parts to be cut from panels of standard thickness in automated router machining operations. The fasteners then are applied manually at precisely machine-defined locations, and the parts are easily and accurately subassembled into the furniture components. The components then are assembled readily into the complete furniture item, all at machine-side, without exposed fasteners or external jigging and with all major exposed surfaces being the prefinished panel surfaces and the edge surfaces being hidden or separately covered, providing thereby a finished product which is ready for shipment to customers directly from machine-side. The flexibility of the machining process together with the furniture design and assembly method permit great flexibility from item to item in the same production operation. This in turn allows rapid production of a variety of different furniture products "to order" from a single machine or production line. Neither the components nor the end products need to be premanufactured for inventory. Rather, a wide variety of products may be rapidly produced "to order", and therefore may be produced as needed for immediate packing and loading for shipment, while maintaining the desired strength, aesthetic and economy goals.

DESCRIPTION OF THE DRAWINGS

FIG. 6A is an enlarged vertical sectional view through a typical dowel shear interconnection of the top panel and a reinforcing member in the top structure of the desk of FIG. 1.

FIG. 7 is an enlarged detailed vertical sectional view of the engagement of a tab of the pedestal bottom panel with the adjacent end panel assembly of the desk of FIG. 1, as at line 9—9 of FIG. 3.

FIG. 8 is a partial top view of an end panel subassembly of the desk of FIG. 1.

FIG. 9 is an enlarged fragmentary exploded perspective view of the top panel, reinforcing members and an end panel at one upper corner of the desk of FIG. 1.

FIG. 10 is a partial perspective view of the inner panel of the pedestal and related components of the desk of FIG. 1.

FIG. 11 is a partial perspective view illustrating the engagement of the modesty panel with the left end panel in the desk of FIG. 1.

FIG. 12 is a partial perspective view of the components at the pedestal end of the desk of FIG. 1.

FIG. 13 is a partial perspective view of the mounting of a glide and support therefor in the lower end of an end panel of the desk of FIG. 1.

FIG. 14 is a vertical section view as at 14—14 of FIG. 12 showing the glide assembly of FIG. 13 fully seated.

FIG. 15 is a perspective view of one known and commercially available connector assembly such as is presently used in the desk of FIG. 1.

FIG. 16 is a perspective view of the recesses formed in a panel for reception and securement of the fixture component of FIG. 15.

FIGS. 17 and 18 are top views illustrating the engagement action between the fitting and the connecting bolt of FIG. 15 as panel components are assembled and secured together.

FIG. 19 is a top perspective view of another workstation employing teachings of this invention.

FIG. 20 is another top perspective view of the return workstation unit of FIG. 21.

FIG. 21 illustrates a drawer front closure arrangement for the desk of FIG. 1.

FIG. 22 illustrates one alternative drawer front closure arrangement.

Figure 1:
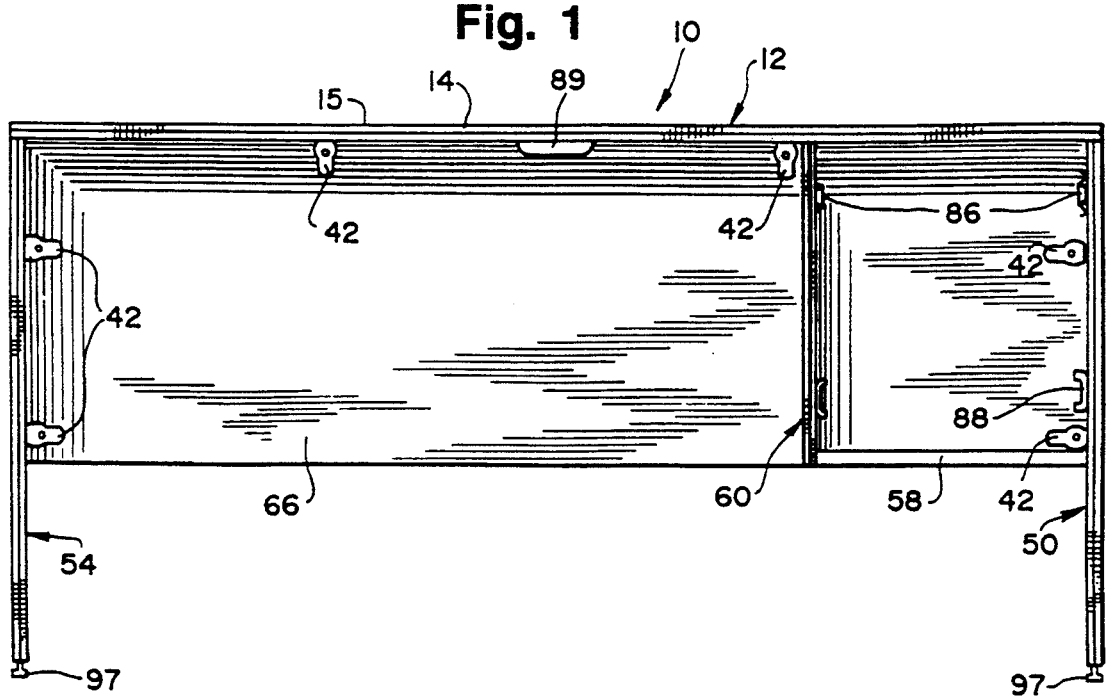
FIG. 1 is a front view of an office desk employing teachings of this invention.

It should be understood that the drawings are not necessarily to scale and that an embodiment is sometimes illustrated in part by schematic and fragmentary views. It should be understood, of course, that the invention is not necessarily limited to the particular embodiments illustrated herein.

DESCRIPTION OF THE PREFERRED EMBODIMENTS

The drawings illustrate designs for and production of desks and similar furniture having major top work surfaces. In each instance, the major top work surface panel is cut and routed to its final configuration from a stock wood panel such as a particle board panel which has a thin finish laminate on its upper side and a balancing laminate on its underside. All of the other components preferably are laid out for cutting and routing to their final configuration from a single additional stock wood panel of the same or similar stock wood panels, preferably in a single router machining operation. An example of such a layout is illustrated in FIG. 6. A single-pedestal desk 10 formed of these components is illustrated assembled in FIGS. 1-3 and in exploded view in FIG. 5. The desk 10 includes a top panel structure 12, a pedestal end support component 50, a free end support panel component 54, a pedestal bottom panel component 58, an inner pedestal wall panel component 60, and a modesty panel component 66.

Figure 4:
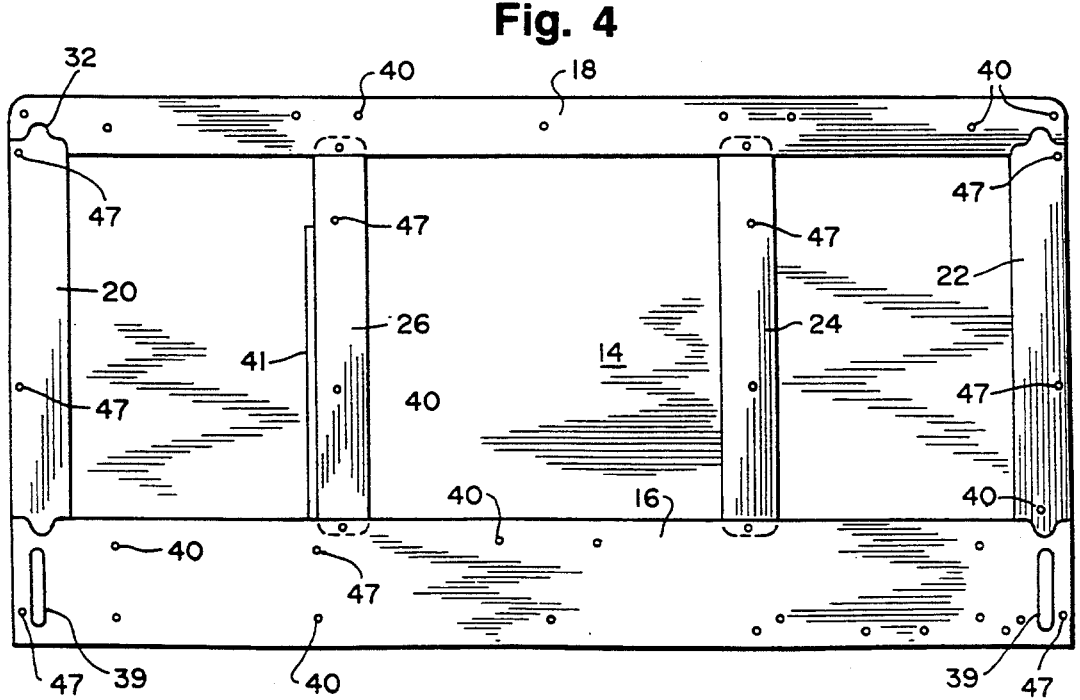
FIG. 4 is a bottom plan view of the top assembly of the desk of FIG. 1.

Referring also to FIGS. 4 and 6, the top panel structure component 12 includes a top or first wood panel member 14 and additional reinforcement and thickness wood panel members 16-26. The top panel 14 is prefinished and provides an unbroken finished top worksurface 15 without any exposed fasteners. The six reinforcement and thickness members 16-26 are assembled to the underside of the top panel 14. The members 16, 18, 20 and 22 are formed with outer edges that collectively are congruent with the outer edge of panel 14 and are in precise registry with the edges of the top panel 14. The members 16-26 provide reinforcement for the top, and the members 16-22 also provide a visual thickness for the top.

Figure 5:
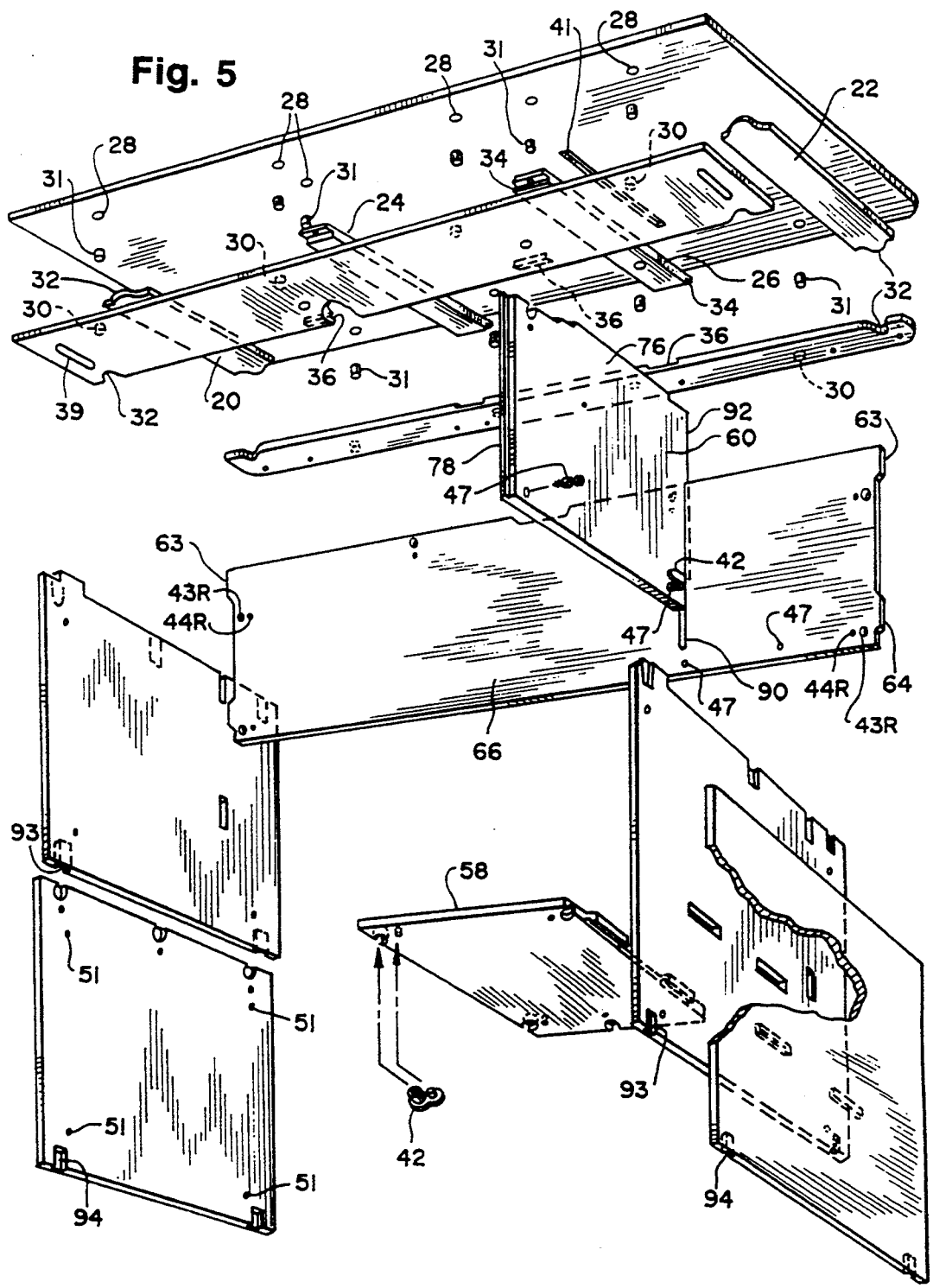
FIG. 5 is an exploded perspective view of the desk of FIG. 1, omitting the drawer slides and the glide supports as well as many of the interpanel fasteners.
Figure 6:
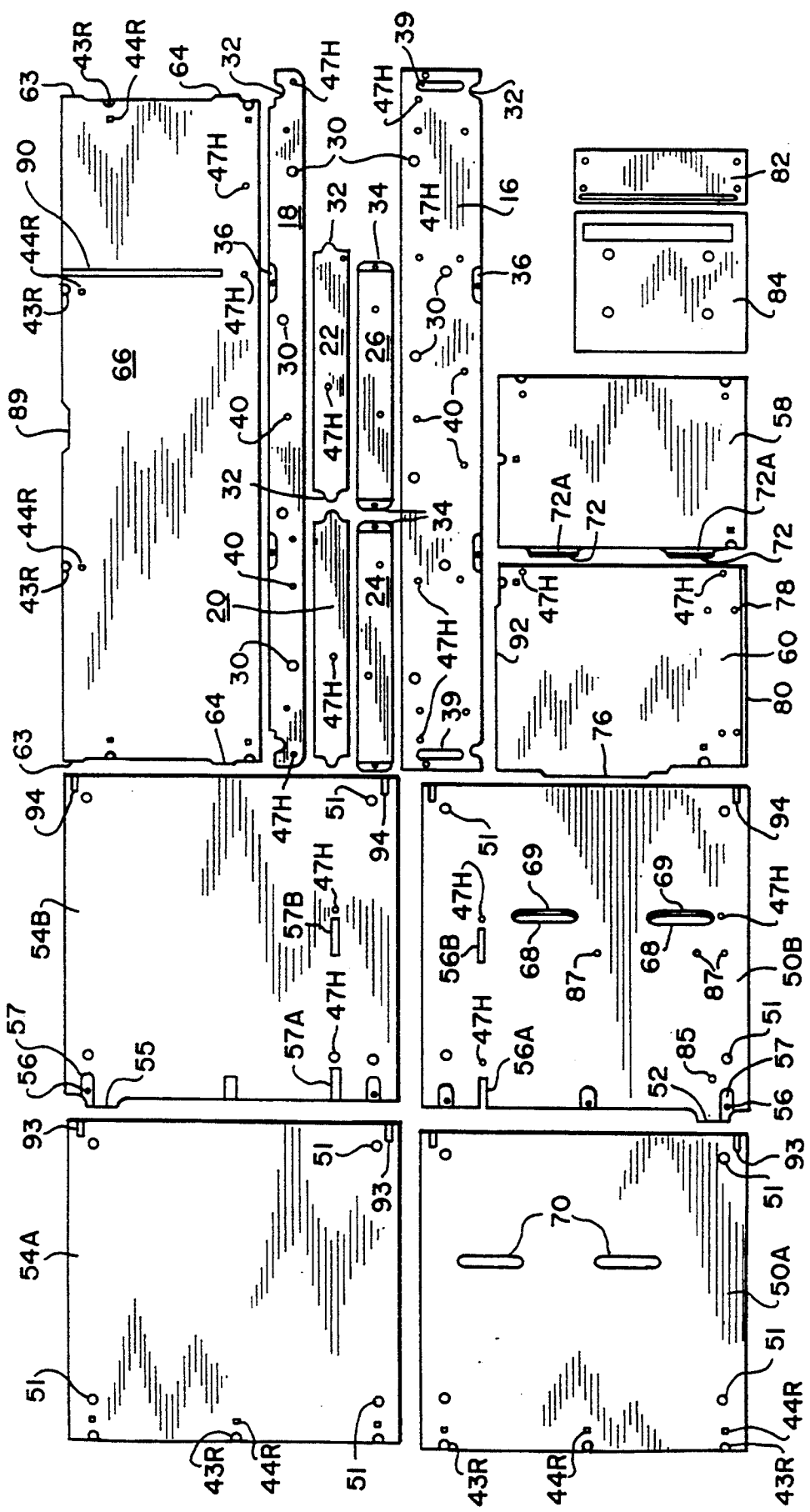
FIG. 6 is a plan view showing the parts for forming the desk of FIG. 1, except for the top panel part, as laid out for machining from a single stock blank wood panel.

Referring to FIGS. 5 and 6A, the top panel 14 and the two longitudinal members 16 and 18 are formed with shallow bore recesses 28, 30 in their mating faces. These recesses do not penetrate through any of these components. The recesses receive short dowels or shear support members 31 that are applied with adhesive to join these components together and provide shear strength at the interface for beam strength and hence rigidity of the assembled top structure 12. The recesses 28, 30 are precisely located in each of these members to assure precise positioning and edge alignment of the members 16 and 18 with the panel 14 when they are joined by the dowels fitting in the respective recesses. The end members 20 and 22 and the pieces 16 and 18 are mating components formed with complementary precisely interfitting bi-directional "jigsaw puzzle" end configurations 32, which provide precise bi-directional positioning of these members within a plane parallel to the top surface, for aligned edge registry of the members 20 and 22 with the end edges of the top panel 14.

The central cross pieces 24 and 26 are routed to form partial thickness rounded tabs 34 that fit closely within precisely matching recesses 36 routed into the upper surfaces of the longitudinal members 16 and 18. The reinforcing member 16 is formed with an elongated recess 39 in its underside near each end to receive a tab of each end panel component 50 and 54 as referred to further below.

The members 16-26 are secured in place against the underside of panel 14 by adhesive in the dowel joints, as previously noted, and a few wood screw fasteners are applied through pre-bored holes 40 in the members 16-26 and into the top panel. The dowels and screws are located at least one inch away from the nearest edge of the respective components wherever possible, greater separation being desirable.

The parts also may be adhered at the interfaces if necessary, but it is preferable to avoid this additional adhesive because of the added steps of application and drying/curing which would be necessary during assembly.

The underside of the top panel also includes a shallow elongated recess 41 (see FIGS. 4 and 5) for locating and providing lateral support for the upper edge of the inner panel 60 of the pedestal, as also referred to further below. The recess 41 is located to be contiguous to the outward edge of reinforcement member 26, see FIG. 4.

The top component 12 thus is fabricated of panel materials of standard thickness while obtaining reinforcement and apparent thickness of the top. The dowels or similar inserted interface elements provide shear strength (force transfer) between the top panel and the longitudinal reinforcement members to provide good beam strength and rigidity of the top structure, and to provide accurate registry of the parts during assembly. No post-assembly finishing is required, other than applying a covering strip 53 of wood, plastic or metal over the aligned exposed edge surfaces (see FIGS. 12, 13, 21 and 22).

Referring particularly to FIGS. 5 and 6, each of the end support panels 50 and 54 is formed of two panel parts 50A, 50B, and 54A, 54B respectfully. In each instance, the panel parts are joined in superposed congruent edge alignment with one another by inserting and adhesively securing short dowels in recesses 51 formed in the respective faces, in the same manner as described above with respect to the top structure. Each inner panel 50B, 54B includes a short integral top tab 52, 55 for engaging the respective recess 39 in the reinforcing member 16 of the top structure. FIG. 8 also shows such a tab 55, as well as illustrating how one element 42 of an interpanel fastener (referred to below) is embedded at the interface between the two panel parts of each end panel by routing a shallow recess 57 in the inner face of one panel member 50B, 54B at a location to accommodate the top body of a connector 42 (FIGS. 15, 17 and 18) which is mounted on the facing panel 50A, 54A.

The illustrated assembly utilizes known commercially available fasteners for securing the assembled panel subassemblies to one another in the desk assembly. These fasteners and their manner of attachment to the panels and the manner of their joining to one another are illustrated in FIGS. 15-18 of the drawings herein. Such connectors presently are provided commercially by Hafele America, of Archdale, N.C. Each of the fasteners includes a fitting 42 which has a generally cylindrical body portion 43 at one end and a smaller cylindrical protrusion 44 at its opposite end. A bifurcated cylindrical cam element 45 is rotatably mounted in the housing portion 43 and includes an exposed slotted drive head 46 by which the cam is rotated, such as through the use of a screwdriver or similar tool. A complementary mounting bolt 47 includes a screw shank 47A, a stop collar 48, a shank 47B and a drive head 49 which is slotted for engagement by a driving tool, such as a screw driver.

The fittings 42 are drive-fit into recesses 43R and 44R provided at appropriate locations in the respective major panel face, near one edge of each panel part to be joined to another panel; see, e.g., FIGS. 5 and 6 which illustrate the recesses, and a few of the respective fasteners in FIG. 5. FIG. 16 illustrates the arrangement of the recesses 43R and 44R adjacent one edge of a panel member, such as the panel 54A. The ends 42A of the fittings 42 are spaced inward slightly from the respective edge of the panel in which mounted, see FIGS. 17 and 18. Each connecting bolt 47 is screwed into a hole 47H bored into a major face of another panel member, such as an end reinforcing member 22. When the panel subassemblies are joined to one another in the illustrated T-joint assembly, with an edge of a panel component abutting a side surface of the respective overlying crossing component, the head and shank 46, 47B of the respective bolt 47 extend into the hollow center of the cam 45. The rotary cam straddles the neck of the respective connecting bolt, its cam surfaces engaging the inner end of head 46 with a drawing action as the cam is rotated by an appropriate turning tool, e.g., a screw driver engaging the exposed screw head 46. The cam gripping, drawing and retaining action establishes and maintains firm abutting contact between the respective edge surface of the panel subassembly carrying the fixture 42 (such as a panel subassembly 54) with the side surface of the overlying panel in which the bolt 47 is mounted (such as the underside of the top assembly 12), as further illustrated in FIGS. 17 and 18.

Referring again to FIG. 8, a fitting 42 is shown mounted in the respective inner panel 54A. The mating panel 54B is formed with the shallow recess 57 to accommodate the elongated top body portion of the fitting 42. A hole 56 through the respective inner panel 50B, 54B communicates with each recess 57 to provide access to the respective cam drive head 46 of the encased fastener, as by a screwdriver, for operating purposes.

Referring to FIG. 6, bores 47H are provided in the reinforcing members 18-26, panel parts 50B and 54B and panels 58 and 60 where indicated to receive the mounting bolts 47. The paired sets of larger circular openings and adjacent small openings along the panel edges are the openings 43R and 44R for the fastener fittings 42. The larger isolated circular openings are the recesses 26, 28 and 51 for the dowels 31, and the remaining smaller circular bores (some labelled 40) are for the wood screw fasteners for use in securing the panel parts to one another. Suitable bores also are provided through the inner panel part 50B and in the inner surface of the inner pedestal panel 60, as at 85 and 87, for locating and receiving appropriate screws for mounting drawer slides, e.g., the slides 86 and 88 referred to further below. None of the recesses or fasteners extend through an externally exposed surface of the desk or through the surfaces of the end panel 54 or the inner pedestal panel 60 which are exposed within the kneespace of the desk 10. In this regard, the access holes 56 are very near the top of inner panel part 50B, well above the usual line-of-right of a user of the desk. Also, the fastener components 42 in the inner surface of the modesty panel 66 are near the periphery thereof and at the innermost surface of the kneespace, and hence are not readily visible.

Referring again to FIGS. 5 and 6, as well as FIG. 7, each of the inner end panel members 50B, 54B also is formed with slots 56A, 56B, and 57A, 57B which provide recesses to receive tabs 63 and 64 provided on opposite ends of the modesty panel 66. The inner panel member 50B also is formed with two slots 68 therethrough, each being enlarged adjacent the outer surface by a stepped recess 69. Recesses 70 formed in the inner surface of the outer panel 50A register with the larger outer portions of the slots 68. As best seen in FIG. 7, the panel member 50B thereby forms a lip 68A at each recess, which is engaged by the respective tab 72 at one edge of the bottom panel 58. Each of the tabs 72 is routed to form a recess 72A (see FIGS. 6 and 7), whereby the tab is L-shaped to be inserted through the inner portion of the slot 68 and then downwardly to engage over the respective lip 68A as illustrated in FIG. 7.

Referring to FIGS. 5, 6 and 10, the upper edge of the inner pedestal panel 60 is of a configuration to form a projecting tab portion 76 for engaging in the recess 41 in the underside of the top panel and to conform to the undersides of the reinforcing members 16 and 18. Tab 76 also abuts the adjacent edge surface of member 26 for further lateral support. The front edge of the inner-pedestal panel 60 is relieved along its inward edge to form an outer lip 78. This provides a front edge recess 80 for seating therein of a plastic end cap strip 81 (FIG. 21).

Figure 2:
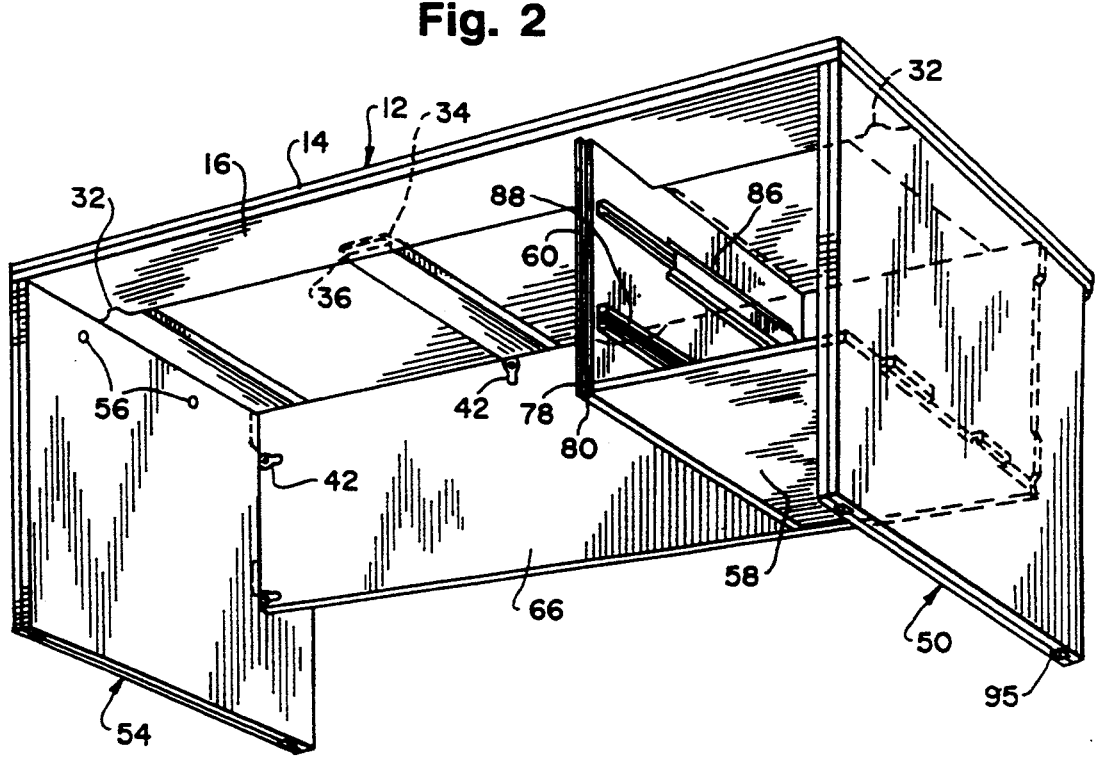
FIG. 2 is a front perspective view, looking upward from the right of the desk of FIG. 1 and showing some hidden configurations in phantom lines, with the glide supports omitted.
Figure 3:
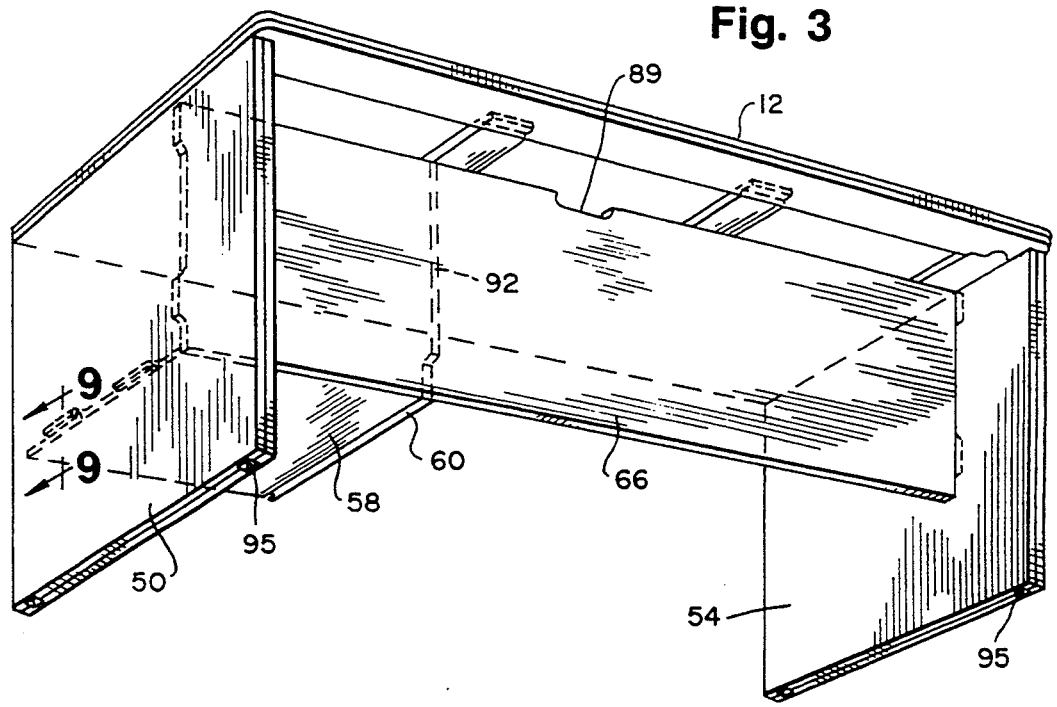
FIG. 3 is a rear perspective view, looking upward from the right of the desk of FIG. 1 and showing some hidden configurations in phantom lines, with the glide supports omitted.

Front drawer end panels 82 and 84 (FIGS. 6 and 21) are provided to be attached to drawers which are to be mounted on pairs of drawer slides 86 and 88 mounted in opposed relation to one another on the inner surfaces of panels 50 and 60, see FIGS. 1 and 2. The drawer end panels overlap the cap strip 81, and thus the end of panel 60, with their opposite edges being adjacent the inner surface of end panel 50. However, other end configurations may be used, e.g. as illustrated by drawer end panel 182 in FIG. 22. In the arrangement of FIG. 21, the strip 81 provides an edge finger recess 81A for fingertip access and drawer pull purposes, whereas in FIG. 22 a corresponding recess 183 is formed in the edge of the front panel.

The modesty panel 66 is provided with a cutout 89 in its top edge to accommodate passage of wires, such as telephone, power cables, etc. It also is routed to provide two sets of fitting openings 43R, 44R along the inside of its top edge and each end edge as shown in FIG. 6, to receive fittings 42 as seen in FIG. 1.

FIG. 9 illustrates the interfitting reinforcement members 18 and 22 in relation to the top panel 14 and the interconnection thereto of the end panel 50. There is shown one of the connector bolts 47 in the underside of the member 18 for engagement by one of the top connectors 42 which are embedded at the interface of the panel members forming the end panel 50, as described above. In the illustrated desk assembly, three such top connectors are provided for each interpanel connection between these components; see also FIGS. 4 and 5.

FIG. 10 illustrates the assembly interconnection of the inner pedestal panel 60 to the top assembly 12, modesty panel 66 and pedestal bottom panel 58. The modesty panel is provided with an elongated shallow recess 90 which receives an edge protrusion 92 of the inner panel 60, see also FIGS. 5 and 6. Fasteners 42 mounted on the inside of the panel 60 engage complementary fastener bolts 47 in the underside of the reinforcing member 16 of the top structure 12 and in the inner surface of the modesty panel. Two fasteners 42 in the adjacent end of the bottom panel 58 engage complementary fastener bolts 47 in the lower edge of panel 60. The engagement of the tab 76 in the recess 41 in the underside of the top structure also is illustrated in FIG. 10.

FIGS. 11 and 12 illustrate the engagement of the end tabs 63, 64 of the modesty panel 66 and the end tabs 72 of the bottom panel 58 into the recesses formed in the end panels 50 and 54. Two fasteners 42 in each end of the panel 66 and one fastener 42 in the end of bottom panel 58 engage respective fastener bolts 47 appropriately located in the end panels 50 and 54. As indicated by the recesses at the inner end of panel 58 in FIG. 6, a single fastener 42 similarly mounted at the lower center inner portion of the bottom panel 58 engages a fastener bolt 47 appropriately located in the abutting surface of the modesty panel 66 (see also FIGS. 5 and 12).

FIGS. 12, 13 and 14 illustrate the mounting of glides in the lower edges of the end panels 50 and 54. Parallel grooves 93 and 94 are milled into the lower end edges of the respective panel members 50A, 50B and 54A, 54B, and each panel member is formed with a shallow surface recess which complement one another to form an aperture 95 in the subassembly comprising the respective end panel 50, 54. A short U-shaped metal channel member 96 is inserted with its flanges engaging the respective grooves 93, 94, straddle of the interpanel joint, as illustrated. The channel 96 threadably engages an adjustable glide 97, the stem of which is freely received within the recess 95, and also reinforces the panel subassembly.

Assembly of the desk 10 from the subassemblies 12, 50, 54, 58, 60 and 66 is affected by positioning and mating the end panels and modesty panel on the top structure, and securing the fittings 42 on the respective prepositioned connecting bolts 47. The pedestal bottom panel is similarly positioned and affixed, followed by positioning and securement of the inner pedestal panel. Cover strips 53 of wood, plastic or metal are applied over the exposed panel edges, e.g., the vertical edges of end panel components 50 and 54 as well as the edges of the top panels, as noted above in referring to the top panel structure 12.

FIGS. 19 and 20 illustrate another workstation 108 which embodies the same construction and assembly principles. The unit 108 includes a single pedestal desk 10 as described above and a J-return 110. Components of the return which correspond to those of the desk 10 are identified by corresponding numbers in the one-hundred series. The top structure 112 is of a generally J-shaped configuration, defining a U-shaped recess 111 for a keyboard station at the inner corner of the J. A keyboard support 111K is shown in this space in FIG. 19, being supported by an articulating support mechanism of a known type which is mounted on the underside of the top structure in a known manner.

The top panel 114 has the J configuration. The reinforcing members are shown in phantom lines and are best seen in FIG. 20. They include a rear member 118, two front members 116A, 116B and two end members 120 and 122 which also have multi-arcuate "jigsaw puzzle" bi-directional locating joints 32 with the front and rear members. A third front reinforcing member 116C is of a generally C-shape to extend around the inner portion of the recess 111. The member 116C has an inner edge conforming to the inner portion of the recess 111, one end portion 116M having a mating configuration 32 with the respective end of reinforcing member 116B, and an opposite end portion 116N which spans between members 116A and 118 as illustrated. End portion 116N abuts the inner edge of member 116A and also fits in a notch 119 in member 118. The reinforcing members are joined to the top panel 114 with dowels and screws to provide edge thickness as well as reinforcement in the same manner as described above for the top structure 12. A further rectangular pad 123 is affixed to the underside of the top panel 114 along the extended centerline of the recess 111, and has a tongue-and-recess interfit with the outer edge portion of member 116C as shown. The pad 123 provides a mounting location for the keyboard support mechanism.

The end panel 154 and front panel 154A each is formed of two matching panel parts joined to one another in the same manner as panel 54. The panels 154 and 154A are provided with tabs which engage recesses in top panel component 112 as in the desk 10. The modesty skirt 166 is joined to the end panel component 154 and to top panel component 112 in the same manner as the modesty panel 66 in desk 10. A free end 167 extends beyond top 112 to overlap the inner surface of the end panel component 50 of the desk 10. The top structure 112, panels 154-154A and modesty panel 166 are assembled to one another and joined by fasteners 42 in the same manner as the components of desk 10, including the embedded fasteners in the double-thickness panels 154 and 154A.

The return 112 is joined to the single pedestal desk 10 by positioning the two units together with the top panels in aligned abutting coplanar relation as in FIG. 19 and the extended end 167 of the modesty panel 166 adjacent the inner surface of the end panel component 50. Screws are applied through the holes 171 in panel 166 and into panel 50. A metal plate 175 also spans the underside of the joint between the two top panel components 12 and 112 and is secured to both by screws.

In the preferred method of this invention separate layouts are created for producing all of the panel parts for one complete assembly of a unit of office furniture from as few stock wood panels as possible. Such panels typically are 49" to 61" wide and 8' to 16' long. For example, the desk 10 is laid out for cutting the top panel from one blank and all other panel parts are laid out for cutting from one further blank as illustrated in FIG. 6. The layout includes the precise locations for all subassembly components and fasteners, including the tabs and recesses and bores and recesses for all fasteners for accurate positional interfitting relationship of all of the parts. Appropriate instructions for precise automated cutting and routing of all shapes, holes and recesses of the various parts are recorded for readout in the controls of an automatic, multi-tool NC controlled router. Typically, all parts are cut from one or two panels in a corresponding number of machining set-up operations, that is, one set-up per panel.

The assembly dowels, fasteners and drawer slides, where appropriate, then are manually inserted and secured in the panel parts, adjacent the machine site. The components to be formed of multiple panel parts are sub-assembled in the same manner and at the same location. In producing the desk 10, these subassembly operations include the assembly of the top structure 12, the end panels 50 and 54, and the inner pedestal panel 60, and applying the fastener components to all components in the machine formed bores and recesses which precisely define the locations for all components except the edge trim.

The resulting desk components then are assembled and joined to one another by assembling the two end panels and the modesty panel onto the top panel, by aligning and securing the respective fasteners 42, 47. This is followed by adding the pedestal bottom and inner panels and securing the respective fasteners 42, 47. None of the fasteners are exposed at an external surface of the assembled desk. Appropriate trim strips are applied over the exposed edges, as desired, as by using flexible bands of plastic or wood molding.

Similarly, the matching drawer front panels 82 and 84 are applied to stock preassembled drawer structures, and the resulting drawers are inserted into the pedestal on the drawer slides.

It will be noted that each of the prospective interpanel joints between the end support panels and the top structure, between the modesty panel and the end panels, between the pedestal bottom panel and the adjacent end panel and between the inner pedestal panel and both the modesty panel and the top structure includes integral tab portions of one of the panels to be mated into a corresponding recess of the other panel across each interpanel plane. That is, each panel has at least one tab-and recess interconnection with a joining panel. These tab-and-recess interconnections are provided in the areas where high loads or impact forces are most likely to be applied to an edge abutting panel in a direction transverse to the joint, generally parallel to the plane of the cross-joint panel. All of the panels are secured in firm abutting relationships with one another by the cam-type quick attachment fasteners.

A J-return 110 or any other furniture unit of a structure similar to desk 10 or return 110 is produced in the same manner by a corresponding sequence of operations.

The result is a completed office furniture unit, ready for shipment directly to the customer. The entire manufacturing operation may be completed within as little as 30 minutes time, with no inventory other than the stock panels, fasteners, basic drawers and trim strips. Moreover, due to the flexibility of computer controlled machining together with the furniture designs and methods provided, successive products produced by the same machine and operating personnel can be of distinctly different configurations and/or models. Thereby, orders for a wide variety of office furniture may be filled promptly on demand, without an inventory either of assembled furniture or of precut components.

When a multi-unit such as the desk and return of FIG. 19 is involved, the two units are subsequently joined to one another at the use site.

It will be seen that the aforementioned objects have been met.

Various modifications of the illustrated preferred embodiments may be made without departing from the spirit and scope of this invention. For example, various flat wood panels may be used and the furniture units may be of a wide variety of designs and functional purposes. Other quick fasteners may be used, though a design which assures snug abutting relation of the joined components, as by a cam action, is preferred.

While particular embodiments of this invention are shown and described herein, it will be understood, of course, that the invention is not to be limited thereto since many modifications may be made by those skilled in the art, particularly in light of the foregoing teachings. It is contemplated, therefore, by the appended claims, to cover any such modifications as fall within the true spirit and scope of this invention.

What is claimed is:

1. A wood office furniture panel construction comprising:
   a first wood panel member forming a top panel member and having uniform thickness, said first wood panel member having an outer exposed surface, an opposite surface parallel to said outer surface, and edge surfaces;
   a plurality of additional wood panel members disposed in a substantially coplanar array with one another, said additional wood panel members being of substantially uniform thickness and each having an outer surface and an opposite surface parallel to said outer surface thereof, and edge surfaces;

said additional wood panel members being affixed to said first wood panel member with said opposite surfaces of said additional wood panel members in contact with said opposite surface of said first wood panel member and providing a planar interface therewith;

a plurality of spaced recesses extending only partially into the opposite surface of the first wood panel member;

a like plurality of corresponding spaced recesses extending only partially into said plurality of additional wood panel members; and shear support members traversing said interface and extending into said first wood panel member spaced recesses and only partially into the corresponding spaced recesses in said additional panel members so as to precisely locate said additional wood panel members relative to said top panel member with a substantial portion of said edge surfaces of said additional wood panel members being coextensive with a substantial portion of said edge surfaces of said first wood panel member while simultaneously providing shear support between said first and said additional wood panel members, thereby forming a unified panel construction having a unified edge thickness equal to the combined thickness of said first and additional wood panel members along said substantial portions of said edge surfaces.

2. The invention as in claim 1 wherein:

said first wood panel member is of an elongated configuration having front and rear longitudinal edges;

said additional wood panel members include both front and back panel members disposed adjacent the corresponding front and rear edges of the first wood panel member and each extending substantially the full longitudinal extent of the first wood panel member; and said shear support members traversing said interface between each of said front and back panel members and said top panel member and extending into each of the recesses in said front and back panel members and extending into corresponding recesses in said first wood panel member.

3. The invention as in claim 1 including:

mating components on certain of said additional wood panel members and said first wood panel member for interfitting with each other to precisely position said certain additional wood panel members relative to said first wood panel member; and said certain additional wood panel members and others of said additional wood panel members having complementary interfitting configurations which fix the position of said other additional wood panel members relative to said certain additional wood panel members bidirectionally while simultaneously fixing their position relative to the said first wood panel member.

4. The invention as in claim 1 wherein:

said first wood panel member is provided with said plurality of recesses in said opposite surface thereof in predetermined locations along two opposite edge portions;

the opposite surface of at least certain ones of said additional wood panel members being provided with corresponding recesses in predetermined mating locations in the opposite surface thereof, and also provided with additional interfitting recesses;

a plurality of transverse members, some of which have a projection that interfits into one of said additional intermitting recesses in one of said additional wood panel members and some of which have a shear support member extending into one of said recesses in said first wood panel member for positioning of said certain additional wood panel members relative to said first wood panel member;

the remaining additional wood panel members and said certain wood panel members having complementary interfitting engagement configurations that provide bidirectional positioning of said remaining additional wood panel members relative to said certain wood panel members within said coplanar arrays; and the positions of said recesses and said interfitting configurations between said additional wood panel members providing precise predetermined registry between said additional wood panel members and said first wood panel member.

5. The invention as in claim 1 wherein at least some of said additional wood panel members extend along the entire peripheral portion of said first wood panel member and collectively provide an outward peripheral edge which is aligned with and coextensive with the outer peripheral edge of said first wood panel member such that said furniture panel construction has an edge thickness equal to the combined thickness of said first wood panel member and said additional panel members throughout its periphery.

6. The invention as in claim 1 wherein said additional wood panel members include at least front and back panel members each extending longitudinally the full length of said first panel.

7. The invention as in claim 6 including said shear support members traversing said interface between each of said front and back longitudinally extending additional panel components and said first wood panel member and extending into said first wood panel member recesses and into corresponding recesses in each of said front and back longitudinally extending additional wood panel components.

8. The invention as in claim 7 wherein each of said shear support members is a wood member.

9. A wood office furniture top panel construction for providing a generally horizontal upper worksurface comprising:

a top wood panel member of uniform thickness, said top wood panel member having an upper exposed surface providing said worksurface and having a lower surface parallel to said upper surface;

a plurality of additional wood panel members, each of said additional wood panel members being of substantially uniform thickness, being elongated, and being of substantially lesser lateral dimension than said top panel member, and having an upper surface and a lower surface parallel to said upper surface of said top wood panel member;

each of said additional wood panel members being affixed to said top wood panel member with said upper surface of a respective additional wood panel member in contact with said lower surface of said top wood panel member and providing a planar interface therewith; and shear support members traversing said interface and engaging a recess that extends only partially into said top wood panel member and engaging a corresponding recess only partially into at least one of said additional wood panel members so as to position said one of said additional wood panel members relative to said top wood panel member and simultaneously provide shear support therebetween, thereby forming a unified top wood panel for strength of said top wood panel construction.

10. The invention as in claim 9 wherein:

said top wood panel member is of an elongated configuration having front and rear longitudinal edges;

said additional wood panel members including first and second wood panel members disposed adjacent the front and rear edges of said top wood panel member and each extending substantially the full longitudinal extent of said top wood panel member; and said shear support members traversing said interface between each of said first and second wood panel members and said top wood panel member and extending only partially into said top wood panel member and only partially into each of said first and second panel members.

11. The invention as in claim 9 including:

mating recesses formed in certain of said additional wood panel members and in said top wood panel member for precisely positioning said certain additional wood panel members relative to said top wood panel member; and said first and second wood panel members and said certain additional wood panel members and others of said additional wood panel members having complementary interfitting recesses which bidirectionally fix the position of said other additional wood panel members and said certain wood panel members relative to said top wood panel member.

12. The invention as in claim 9 further including:

recesses partially extending into the lower surface of said top wood panel member in predetermined locations along two opposite edge portions thereof; and mating recesses partially extending into corresponding predetermined locations in the upper surfaces of at least certain of said additional wood panel members;

interlocking recesses in at least certain of said additional wood panel members;

at least two transverse members included in said additional wood panel members, each of which has a portion that interfits into a corresponding one of said interlocking recesses in one of said additional wood panel members and also has at least one shear support hat engages a corresponding one of said mating wood panel recesses in said top wood panel member for positioning said certain additional wood panel members relative to said first wood panel member; and the remaining additional wood panel members and said certain wood panel members having complementary interfitting engagement configurations that provide bidirectional positioning of said remaining wood panel members relative to said certain wood panel members within a plane parallel to said lower surface of said top wood panel member, the positions of said mating recesses, interlocking recesses, and interfitting configurations between said additional wood panel members providing precise predetermined registry between said additional wood panel members and said top wood panel member.

13. The invention as in claim 12 wherein:

said top wood panel member is of an elongated configuration having front and rear longitudinal edge portions;

said recesses in the lower surface of said top wood panel member being disposed along each of said longitudinal edge portions;

said certain wood panel members including front and back wood panel members each extending substantially the full length of said top wood panel member, having said mating recesses extending only partially through the upper surfaces thereof and including said interlocking recesses;

said transverse members interfitting with said interlocking recesses in said front and back wood panel members to provide precise predetermined registry of one longitudinal edge of each of said front and back wood panel members with one longitudinal edge of said top wood panel member; and additional panel members including additional transverse members having said complementary interfitting configurations to engage corresponding ones of said interlocking recesses in said front and back wood panel members.

14. The invention as in claim 9 wherein said additional wood panel members extend along the entire peripheral portion of said top wood panel member and collectively provide an outward peripheral edge which is aligned with and coextensive with the outer peripheral edge of said top wood panel member whereby said top panel construction has an edge thickness equal to the combined thickness of said top wood panel member and said additional wood panel members throughout its periphery.

15. The invention as in claim 9 wherein each of said additional wood panel members is adhesively secured to said top wood panel member.

16. The invention as in claim 9 wherein said additional panel members include at least first and second wood panel members each extending longitudinally the full length of said top wood panel member.

17. The invention as in claim 16 including said shear support members traversing said interface between each of said first and second longitudinally extending additional wood panel members and said top wood panel member and extending only partially into said top wood panel member and only partially into each of said first and second longitudinally extending additional wood panel members.

18. The invention as in claim 17 wherein each of said first and second additional wood panel members is adhesively secured to said top wood panel member.

19. A wood office workstation assembly including:

a top panel construction providing a generally horizontal upper worksurface and comprising:

(a) a top wood panel member of uniform thickness;

(b) said top wood panel member having an upper exposed surface providing said worksurface and having a lower surface parallel to said upper surface;

(c) a plurality of additional wood panel members;

(d) each of said additional wood panel members being of substantially uniform thickness, being elongated, having a substantially lesser lateral dimension that said top wood panel member, and having an upper surface and a lower surface parallel to said upper surface thereof; and (e) each of said additional wood panel members being affixed to said top wood panel member with said upper surface of the respective additional wood panel member in contact with said lower surface of said top wood panel member and providing a planar interface therewith; and shear support members traversing said interface and extending only partially into said top wood panel member and only partially into at least one of said additional wood panel members thereby positioning said one of said additional wood panel members relative to said top wood panel member and simultaneously providing shear support therebetween so as to form a unified top panel for strength and rigidity.

\* \* \* \* \*